US008086236B2

(12) United States Patent
Wu (10) Patent No.: US 8,086,236 B2
(45) Date of Patent: Dec. 27, 2011

(54) METHODS TO CONFIGURE PROXIMITY INDICATION IN WIRELESS COMMUNICATIONS SYSTEMS (75) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 12/984,597

(22) Filed: Jan. 4, 2011

(65) Prior Publication Data
US 2011/0165875 A1    Jul. 7, 2011

Related U.S. Application Data (60) Provisional application No. 61/292,497, filed on Jan. 6, 2010.

(51) Int. Cl.
H04W 36/00 (2009.01)
(52) U.S. Cl. .................. 455/436; 455/439; 370/331
(58) Field of Classification Search ............... 455/435.2, 455/436, 437, 438, 439, 442; 370/330, 331, 370/332
See application file for complete search history.

(56) References Cited

U.S. PATENT DOCUMENTS

| 6,836,471 | B2 * | 12/2004 | Holma et al. ............... 370/331 |
| 7,181,218 | B2 | 2/2007 | Ovesjo et al. |
| 7,626,956 | B2 | 12/2009 | Palenius et al. |
| 2002/0160785 | A1 * | 10/2002 | Ovesjo et al. ............... 455/453 |
| 2005/0003819 | A1 | 1/2005 | Wu |
| 2006/0194580 | A1 | 8/2006 | Gruber |
| 2007/0026866 | A1 | 2/2007 | Krishnamurthi et al. |
| 2007/0037594 | A1 | 2/2007 | Palenius et al. |
| 2007/0213055 | A1 | 9/2007 | Sundberg et al. |
| 2007/0213059 | A1 | 9/2007 | Shaheen |
| 2008/0014957 | A1 | 1/2008 | Ore |
| 2009/0207805 | A1 | 8/2009 | Zou |
| 2009/0316655 | A1 * | 12/2009 | Prakash et al. ............... 370/331 |
| 2010/0056150 | A1 | 3/2010 | Mooney et al. |
| 2011/0103301 | A1 * | 5/2011 | Mueck et al. ............... 370/328 |

FOREIGN PATENT DOCUMENTS

KR    20090098638 A    9/2009

(Continued)

OTHER PUBLICATIONS

Nokia Siemens Networks, Nokia Corporation; "CSG inbound mobility;" 3rd Generation Partnership Project (3GPP) TSG-RAN WG2 Meeting #68; Nov. 1-13, 2009; pp. 1-22.

(Continued)

Primary Examiner — Cong Tran
(74) Attorney, Agent, or Firm — Perkins Coie LLP (57) ABSTRACT A method and system configures proximity indication in a wireless device as part of a network handover procedure to handover the wireless device from a first radio access network (RAN) using a radio access technology (RAT) to a second RAN using a different RAT. The first RAN may use third generation (3G) wireless technology to initiate a process to handover a wireless device to the second RAN, which utilizes long term evolution (LTE) technology. As part of the handover process, the second RAN generates a handover command message that additionally includes proximity indication configuration information to enable the wireless device to configure proximity indication reporting. The handover command message is sent through the first RAN to the wireless device, where the handover command message is utilized to configure proximity indication reporting and to perform the handover from the first RAN to the second RAN.

20 Claims, 6 Drawing Sheets

FOREIGN PATENT DOCUMENTS

| WO | 2008131588 A1 | 11/2008 |
| WO | 2009103189 A1 | 8/2009 |
| WO | 2009142963 A2 | 11/2009 |

OTHER PUBLICATIONS

Motorola, Interdigital; "Draft CR capturing HeNB inbound mobility agreements;" 3rd Generation Partnership Project (3GPP) TSG-RAN WG2 Meeting #68; Nov. 1-13, 2009; pp. 1-4.

HTC Corporation; "On the need of proximity and likely/unlikely indicators;" 3rd Generation Partnership Project (3GPP) TSG-RAN WG2 Meeting #68; Nov. 1-13, 2009; pp. 1-6.

3rd Generation Partnership Project, "3GPP TS 36.331 V9.1.0 (Dec. 2009)," Technical Specification Group Radio Access Network; Evolved Universal Terrestrial Radio Access (E-UTRA) Radio Resource Control (RRC); Protocol specification (Release 9); Dec. 2009; pp. 1-232.

\* cited by examiner

METHODS TO CONFIGURE PROXIMITY INDICATION IN WIRELESS COMMUNICATIONS SYSTEMS

CROSS-REFERENCE TO RELATED APPLICATION(S)

This application is related and claims priority to Provisional Application No. 61/292,497, filed Jan. 6, 2010 and titled METHODS TO CONFIGURE PROXIMITY INDICATION IN WIRELESS COMMUNICATIONS SYSTEMS, the disclosure of which is incorporated herein by reference in its entirety.

BACKGROUND

In the past few decades, telephone systems have evolved continuously at an accelerated rate. A long term evolution (LTE) system, initiated by the third generation partnership project (3GPP), is now being regarded as a new radio access technology (RAT) and core radio network architecture that provides a high data rate, low latency, packet optimization, and improved system capacity and coverage. In the LTE system, an evolved universal terrestrial radio access network (EUTRAN) includes a plurality of evolved Node-Bs (eNBs) and communicates with a plurality of mobile stations, also referred to as user equipments (UEs).

Another evolution in telecommunications is the introduction of femtocells. A femtocell is a small cellular base station, typically designed for use in a home or small business. Femtocells generally connect to the service provider's network via broadband (such as DSL or cable); current designs typically support 2 to 4 active UEs in a residential setting and 8 to 16 active mobile phones in enterprise settings. A femtocell allows service providers to extend service coverage indoors, especially where access would otherwise be limited or unavailable. In LTE terms, femtocells are called Home eNode Bs (HeNBs) and are one type of RAT object. A RAT object, or measurement object, generally is an object on which the UE shall measure measurement quantities and corresponding object information. The RAT object may include a single cell, or a list of cells to be considered as well as associated parameters, e.g. frequency-specific offsets or cell-specific offsets. HeNBs are typically associated with uncoordinated large-scale deployments of several HeNBs in one or more closed subscriber groups (CSGs) and, therefore, the connection to the operator's core network needs to be realized efficiently. A CSG is a specific group of UEs permitted access to a femtocell. A CSG-ID is broadcast from the femtocell in a system information block (SIB) message and only those UEs who are members of this group, as defined by a CSG white list of CSG IDs (generally stored on the UE), will attempt to select the cell.

Before deciding to hand over a UE to a CSG, the eNB (or Macro eNB) generally needs to acquire UE measurement information related to the target CSG cell. In order to allow the UE to make those measurements efficiently, a newly defined proximity report can be configured within the UE via a radio resource control (RRC) connection reconfiguration message. This proximity report will allow the UE to send a so-called "proximity indication" to the source eNB whenever it is entering or leaving the proximity of one or more cells with CSG IDs in the UE's CSG whitelist. A UE that is able to determine that it is near its CSG cell can thus tell the network to take the necessary actions for measurement or handover preparation.

An RRC connection reconfiguration procedure is used by the RRC layer of the EUTRAN to modify a UE's RRC connection, e.g., to establish/modify/release radio bearers, to perform handover, or to set up/modify/release measurements. When the UE receives an RRC connection reconfiguration message, the UE performs an RRC connection reconfiguration procedure based on information within the message. For example, the EUTRAN can configure the UE to report measurement information to support the control of UE mobility to a CSG. Additionally, the EUTRAN can configure, via an RRC connection reconfiguration message, the UE for an inter-RAT handover from a legacy wireless network (GPRS, UTRA, CDMA2000) to the EUTRAN. However, receiving and processing the RRC connection reconfiguration message is costly in terms of delays and the amount of battery power required by the UE to comply with RRC messages.

SUMMARY

Introduced herein are methods and systems for configuring a UE for proximity indication reporting as part of an inter-RAT handover procedure by utilizing a single RRC connection reconfiguration message for both the handover and proximity indication configuration processes.

In one embodiment, the eNB includes proximity indication configuration information in the RRC connection reconfiguration message used by the EUTRAN as part of the inter-RAT handover from a non-EUTRAN. The proximity configuration information is added to preexisting information within the message. The message is sent to the UE via a node within a non-EUTRAN, and the non-EUTRAN transparently forwards the message to the UE.

In some embodiments, upon the receipt of the message by the UE, the UE substantially simultaneously performs the inter-RAT handover procedure and the proximity indication configuration. Based on the proximity indication information in the message, the EUTRAN can configure the UE to report measurement information to support UE mobility.

In a further embodiment, upon the receipt of the proximity indication information in the RRC connection reconfiguration message, the UE can detect and report on one or more HeNBs and/or CSGs within radio proximity of the UE. The reported information can be used by the eNB to perform a second handover of the UE from the source eNB to the HeNB or CSG cell.

The solution presented here overcomes the time and power consumption limitations of prior art methods that establish multiple separate messaging instances to handover the UE to the EUTRAN and to configure the UE to report proximity indications.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not necessarily all refer to the same embodiment.

Current implementations of LTE require the successful delivery of one RRC connection reconfiguration message to a UE for handing over the UE from a legacy wireless network (non-EUTRAN) to an LTE wireless network (EUTRAN). A separate, second RRC connection reconfiguration message is additionally required after the handover of the UE to the EUTRAN to configure proximity indication reporting in the UE.

The necessity of the EUTRAN to configure proximity indication reporting via a separate RRC connection reconfiguration message different from the message used during the inter-RAT handover to EUTRAN procedure is not efficient, causing both delays and undue power consumption from the limited capacity of the UE's battery. The delay and power consumption problems are amplified with the introduction of a plethora of CSGs spread throughout the LTE network because after an inter-RAT handover to the EUTRAN, the UE must be configured to detect the proximity of one or more HeNBs or CSGs. The problems of prior art are solved by the invention presented herein.

Figure 1:
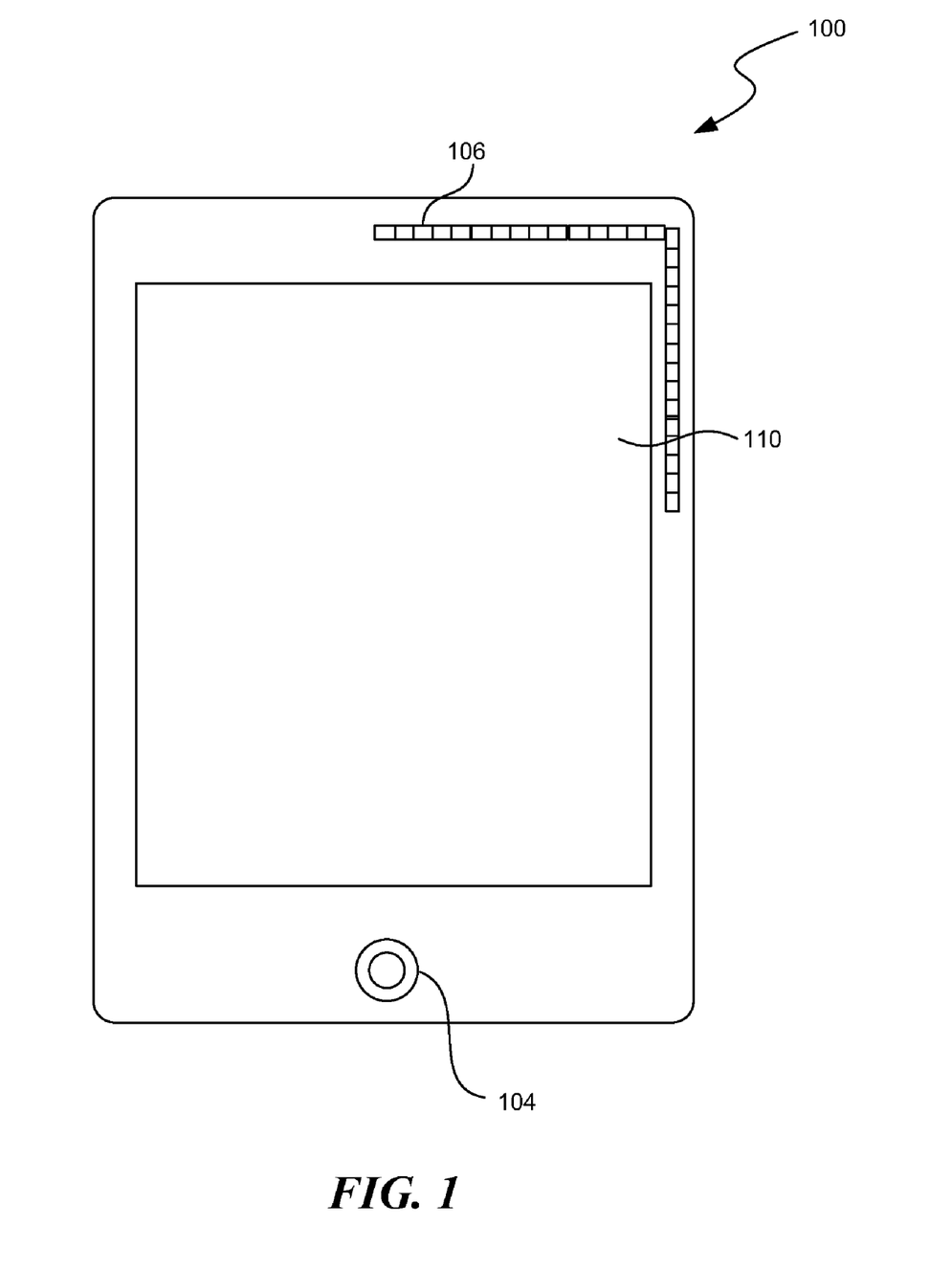
FIG. 1 illustrates a user equipment (UE).

FIG. 1 shows a user equipment (UE) 100 in which the techniques introduced here can be implemented. It is noted that the UE described here is an illustration of one type of a wireless device in which the techniques can be implemented and that other wireless devices can be used for implementing the techniques. For example, UEs may include a cell phone, a personal digital assistant (PDA), a portable email device (e.g., a Blackberry® device), a portable media player (e.g., an Apple iPod Touch®), a tablet or slate computer (e.g., an Apple iPad®), a netbook computer, a notebook computer, an e-reader, or any other device having wireless communication capability.

The UE 100 includes a display 110 used to make and to receive telephone calls and to display data services. In some embodiments, the display 110 is a touch screen that allows for the direct manipulation of displayed data. The UE has a multifunction input module 104 to operate the UE, navigate the display, and perform selections on data. The input module 104 can be, for example, a keyboard, mouse, trackball, touch screen, or any other input module capable of communicating a user selection. Additionally, the UE operates an antenna system 106 to send and receive information to a wireless network.

Figure 2:
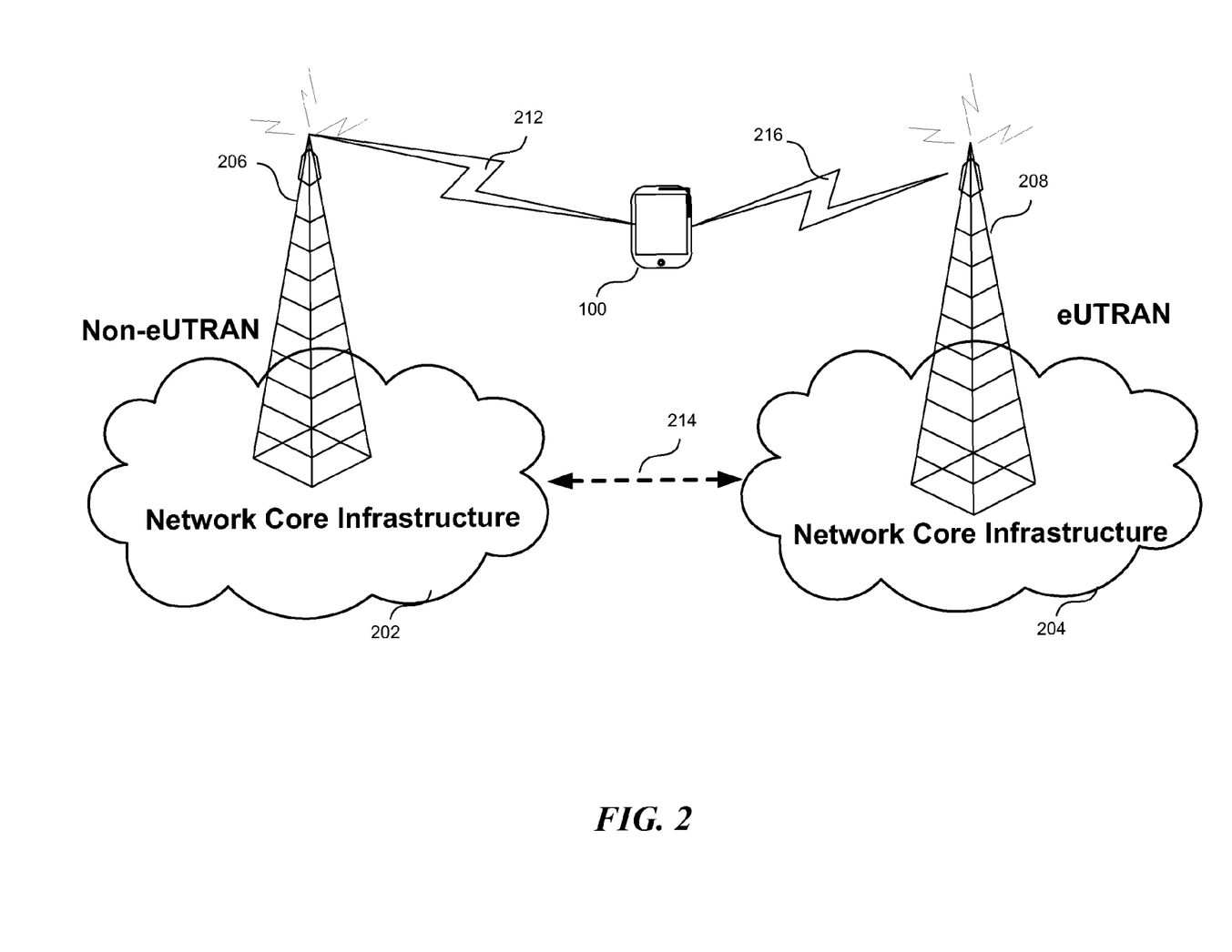
FIG. 2 is a high-level diagram showing communication flow between different RATs and the UE.

FIG. 2 is an illustration of communication flow 212 and 216 between the UE 100, a non-EUTRA core network infrastructure 202 ("non-EUTRAN"), and the EUTRA core network infrastructure ("EUTRAN") 204. The non-EUTRAN 202 is any wireless communication technology that implements a different RAT than the RAT used by the EUTRAN 204. For example, the non-EUTRAN 202 can utilize CDMA2000, UMTS, GPRS, or WiMAX standards and technology.

The non-EUTRAN 202 contains one or more base transceiver stations (or "Node Bs" in 3G networks) 206 to communicate to other base transceivers and network core components (not shown) within the non-EUTRAN 202. Additionally, the core components of the non-EUTRAN 202 can communicate via a communication infrastructure 214 to base transceivers and core components using other RATs. One such other RAT is that used by the EUTRAN 204.

The EUTRAN 204 is a wireless communication network utilizing the air interface of 3GPP's LTE upgrade path for mobile networks. "EUTRAN" is the abbreviation for "evolved UMTS Terrestrial Radio Access Network", also referred to as the 3GPP work item on the Long Term Evolution and is also known as the evolved universal terrestrial radio access (EUTRA) in early drafts of the 3GPP LTE specification. The EUTRAN is a radio access network standard meant to be a replacement of the UMTS, HSDPA, and HSUPA technologies specified in 3GPP releases 5 and beyond. LTE's EUTRA is an entirely new air interface system. It provides higher data rates and lower latency and is optimized for packet data. Included within the EUTRAN 204 is an evolved Node B (eNB) 208 that communicates with the UE using orthogonal frequency-division multiple access (OFDMA) radio access for the downlink and single-carrier frequency-division multiple access (SC-FDMA) on the uplink and additionally communicates with other core technologies (not shown) within the EUTRAN 204. The EUTRAN 204 is connected via the communication infrastructure 214 to the non-EUTRAN 202.

The communication infrastructure 214 interconnects non-EUTRAN 202 and EUTRAN 204. The communication infrastructure 214 is an interface that is standardized in order to allow multivendor interoperability. In one embodiment, the communication infrastructure 214 is the Internet (not shown), which allows for the transformation of information in packets over a TCP/IP protocol. In another environment, the communication infrastructure 214 is a serial or parallel transmission line allowing for the transfer of analog and/or digital information between the non-EUTRAN 202 and the EUTRAN 204.

Figure 3:
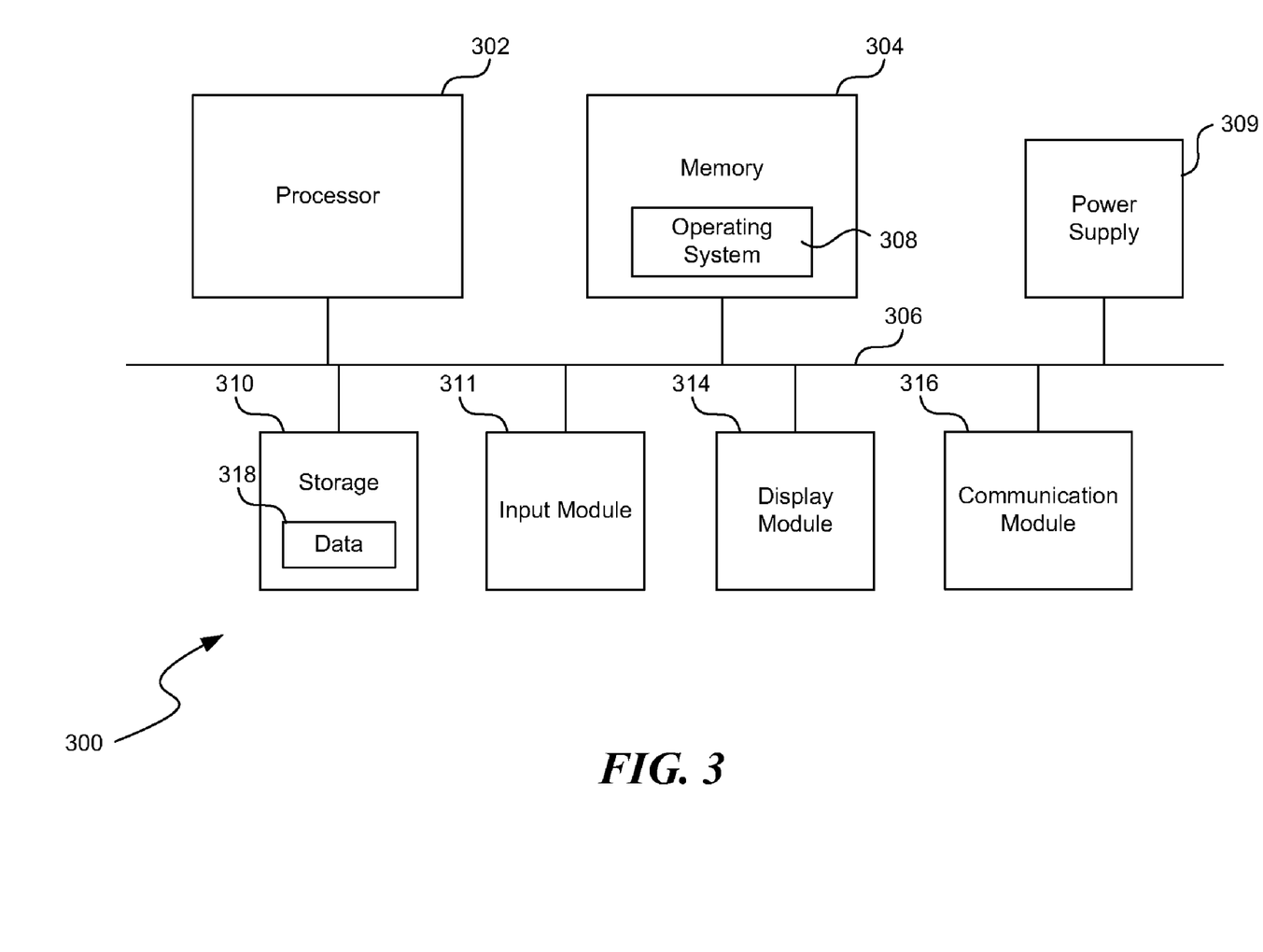
FIG. 3 is a high-level block diagram showing an example of the hardware architecture of a UE.

FIG. 3 is a block diagram of one embodiment of the internal structure of the UE 100 that can implement one or more features of the invention. In the illustrated embodiment, the UE architecture 300 is a computer system that includes a processor subsystem 302 that further includes one or more processors. The UE architecture 300 further includes a memory 304, a storage module 310, an input module 104, a display module 314, and a communication module 316 each interconnected by an interconnect 306 and powered by a power supply 309.

The UE architecture 300 can be embodied as a single- or multi-processor system that preferably implements a high-level module to receive data 318 from a base transceiver station 206 and/or 208. The received data 318 is communicated via the communication module 316, which includes a single or multiple antenna system capable of receiving and transmitting data based on one or more frequencies. The data 318 can be stored in the storage module 310 for retrieval by the processor subsystem 302 and memory 304. The processor subsystem 302 is configured by the data 318 to perform the features of the invention, such as configuring the UE 100 to perform an inter-RAT handover and configuring the UE 100 to perform proximity indication reporting.

For example and as further explained below, upon the receipt of an RRC connection reconfiguration message from the eNB, the communication module 316, in conjunction with the processor subsystem 302, relays the message to the storage module 310, via the interconnect 306. Based on the inter-RAT information of the message, the subsystem 302 is configured based on the data 318 of the message to perform a handover from the non-EUTRAN 202 to the EUTRAN 204. Additionally and based on the proximity indication information of the message, the subsystem 302 is configured to perform a measurement on nearby network objects and report the measurements to the EUTRAN 204.

The display module 314 is configured to connect to the display 110 (FIG. 1) to illustrate information for viewing on the display 110. Information for display can consist of textual, graphical, and/or multimedia information and is presentable in a graphical user interface. In some embodiments, the display 110 is a touch screen that allows for the direct manipulation of displayed information. The displayed information is additionally manipulable by the input module 104.

The input module 311 is configured to receive data from a signal originating from input module 104. The signal may include a user selection transmitted to the input module 311 that conveys the signal to the processor subsystem 302 and an operating system 308, via the interconnect 306.

The memory 304 illustratively comprises storage locations that are addressable by the processor subsystem 302 and components 309, 310, 311, 314, and 316 for storing software program code and data structures associated with the present invention. The processor subsystem 302 and components may, in turn, comprise processing elements and/or logic circuitry configured to execute the software code and manipulate the data structures. The operating system 308, portions of which are typically resident in memory and executed by the processor subsystem 302, functionally organizes the UE architecture 300 by (among other things) configuring the processor subsystem 302 to invoke handover and proximity indication related operations in support of the present invention. It will be apparent to those skilled in the art that other processing and memory implementations, including various computer readable storage media, may be used for storing and executing program instructions pertaining to the technique introduced here.

One skilled in the art will appreciate that the above system 300 has a structure similar to that used to operate base transceiver stations 206 and 208. For example, the internal architecture of the base transceiver stations 206 and 208 include a communication module 316, processor subsystem 302, memory 304, and storage module 310, each configured to communicate via interconnected 306.

Figure 4:
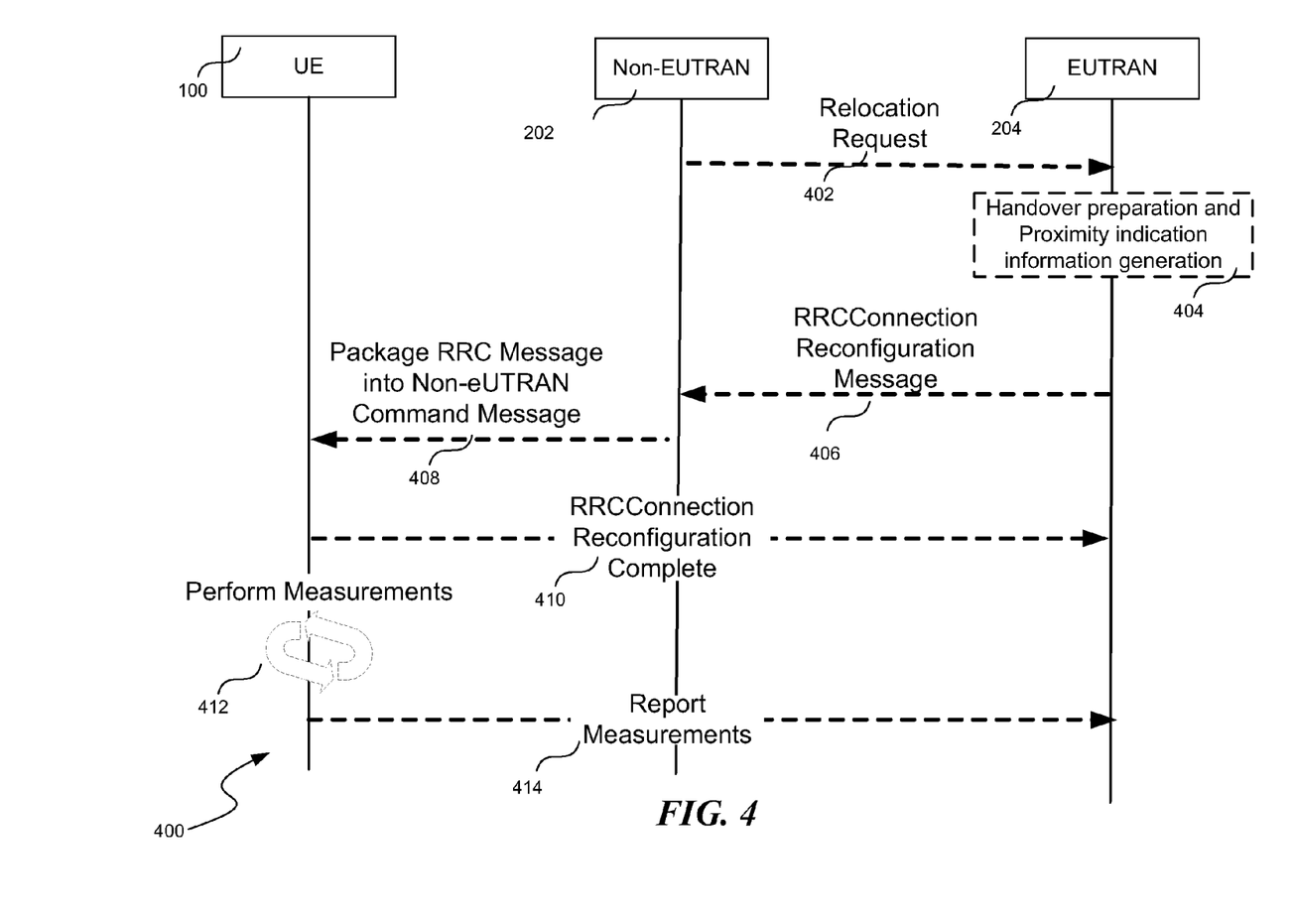
FIG. 4 illustrates an example of the communication between a non-EUTRAN, a EUTRAN, and a UE during an inter-RAT handover of the UE.

FIG. 4 is an illustration of the inter-RAT communication flow between a non-EUTRAN 202, EUTRAN 204 and UE 100. The non-EUTRAN 202 initiates the handover to EUTRAN procedure, in accordance with the specifications applicable for that RAT, by sending an Relocation Request message 402 to the EUTRAN 204. Inter-RAT handover is a backwards handover, i.e., radio resources are prepared in the (target) EUTRAN 204 before the UE 100 is commanded by the (source) non-EUTRAN 202 to handover to the EUTRAN 204. Upon receipt of and based on the message 402, the EUTRAN 204 generates proximity indication information to include in an RRCConnectionReconfiguration message 406 sent to the UE 100 via the Non-EUTRAN 202. Upon receiving the RRCConnectionReconfiguration message 406, the Non-EUTRAN transparently sends to the UE 100 a non-EUTRAN command message 408 having the RRCConnectionReconfiguration message 406, i.e. and as further explained below, the non-EUTRAN does not modify or add to the message 406. The non-EUTRAN command message 408 utilizes a format common to the non-EUTRAN and without changing the content of the message. The UE then sends an RRCConnectionReconfigurationComplete message 410 to the EUTRAN 204. Based on the message 408, the UE 100 configures its internal architecture 300 for the handover to the EUTRAN 204 and configures its internal architecture to enable proximity indication reporting before or after sending the 410 message. Once proximity indication is enabled in the UE 100, the UE 100 can perform measurements 412 on objects, such as HeNBs and CSGs, and report this information 414 to the EUTRAN 204.

Figure 5A:
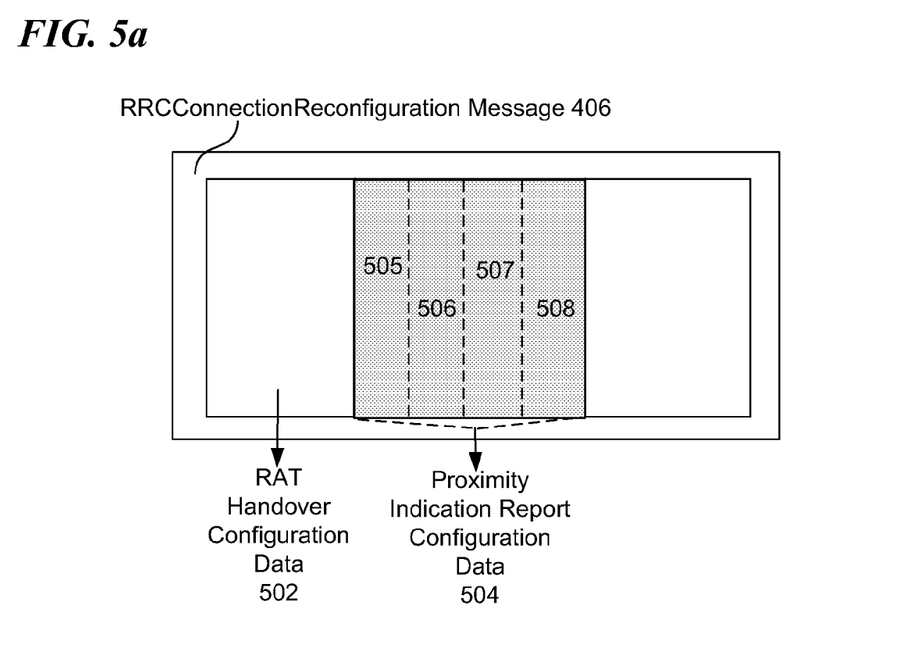
FIG. 5a illustrates an example of the RRC connection reconfiguration messaging details.

FIG. 5a illustrates one embodiment of the RRCConnectionReconfiguration message 406 sent from the non-EUTRAN 202 to the EUTRAN 204. The message contains RAT handover configuration data 502 that is sent from the non-EUTRAN 202 for handing over the UE 100. Additionally, proximity indication report configuration data 504 is generated in the message to enable the UE 100 to take measurements of telecommunication objects, such as a macro eNB, a HeNB or a CSG. The illustration shows one embodiment of the layout of data 502 and 504, but other layouts and formats are contemplated and known to those familiar with the art. Proximity indication report configuration data 504 can further contain a varying amount of sub-elements 505-508. Each sub-element 505-508 can contain more specific proximity indication information. Some examples include whether to report proximity ("reportProximityConfig") while in the EUTRAN 204 ("allowed" or "disallowed") or the non-EUTRAN 202 ("allowed" or "not allowed"), whether autonomous searching by the UE 100 is enabled, and whether "mobilityControlInfo" is defined.

Figure 5B:
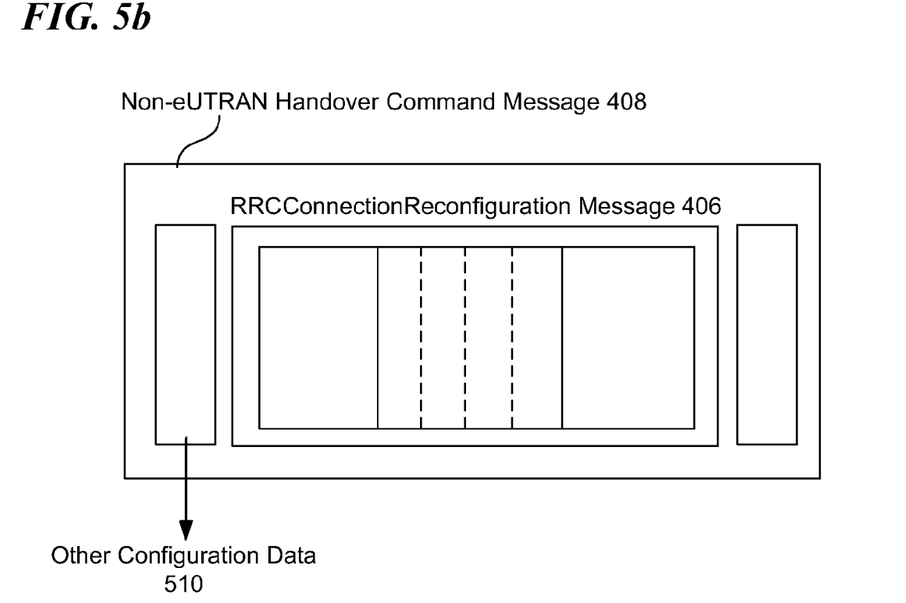
FIG. 5b illustrates an example of a Handover Command from a non-EUTRAN used to send the RRC connection reconfiguration message of FIG. 5a to a UE.

FIG. 5b illustrates an example of a Handover Command message from a non-EUTRAN used to send the RRC connection reconfiguration message of FIG. 5a to a UE. The RRCConnectionReconfiguration message 408 is sent by the non-EUTRAN 202 to the UE in a format common to the Non-EUTRAN. Message 408 contains the message 406 and other configuration data 510 that is used by the non-EUTRAN 202 to hand over the UE 100. In one embodiment, the message 408 is a packet switched (PS) HANDOVER COMMAND message used by GPRS networks to hand over the UE 100 to another RAT network. In yet another embodiment, the message 408 is a Universal Mobile Telecommunications System Terrestrial Radio Access Network (UTRAN) message utilizing a HANDOVER FROM UTRAN COMMAND message. Other message formats from other RATs known in the art can additionally be used.

Figure 6:
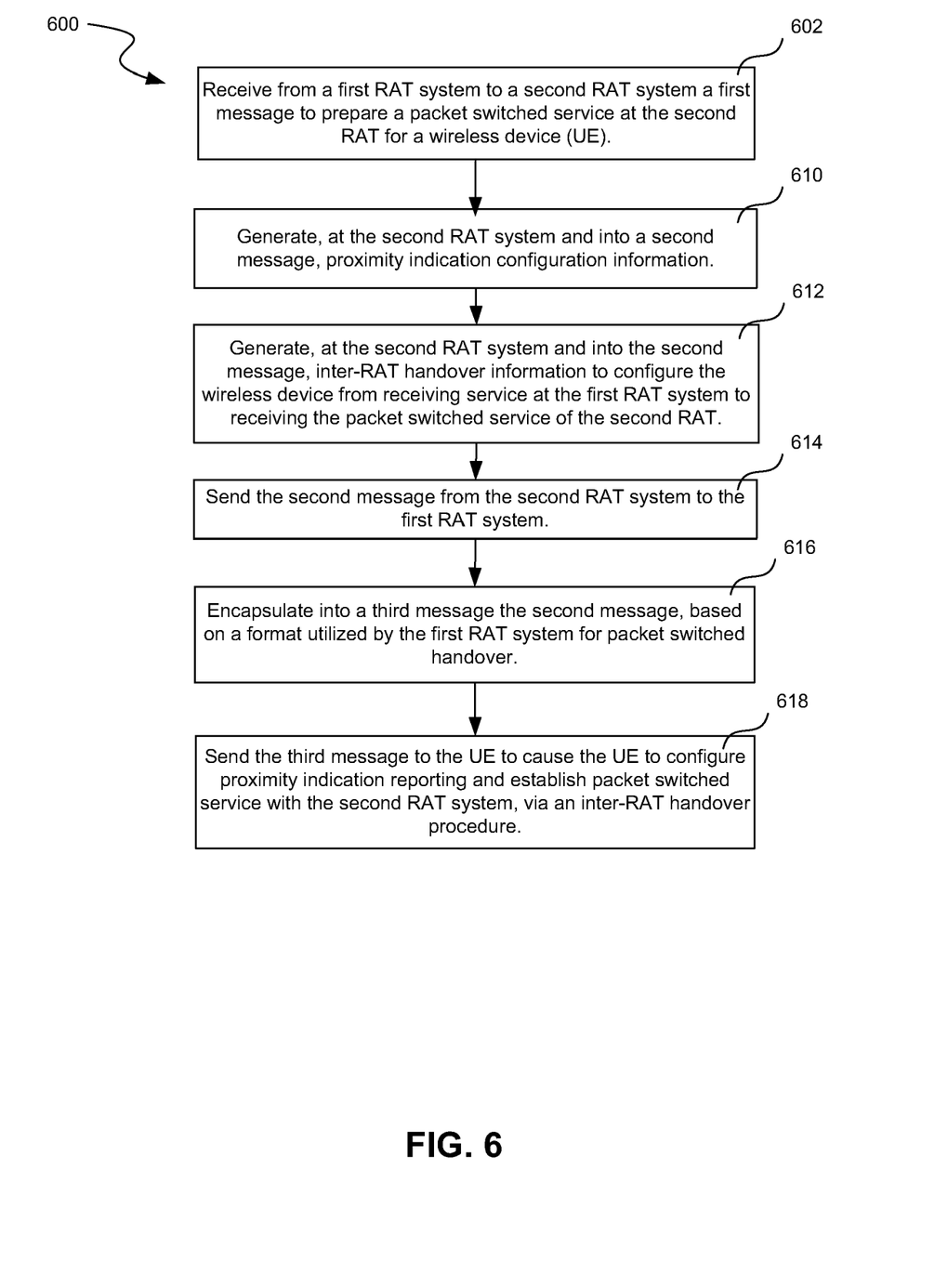
FIG. 6 is a flow diagram illustrating a process for configuring proximity indication reporting within a UE to perform an inter-RAT handover of the UE, based on the creation of proximity indication information within the RRC connection reconfiguration message.

FIG. 6 is a flow diagram 600 illustrating a process for configuring proximity indication reporting within a UE. At step 602, the first RAT system (such as the non-EUTRAN 202) delivers to a second RAT system (such as the EUTRAN 204) a first message to request preparing a packet switched service at the second RAT for a wireless device (such as UE 100). At step 610, the second RAT system generates an RRCConnectionReconfiguration message containing the proximity indication configuration information. Step 612 describes generating, at the second RAT system, inter-RAT handover information to configure the UE from receiving service at the first RAT system to receiving the packet switched service of the second RAT. This handover information is added to the RRCConnectionReconfiguration message along with the proximity indication configuration information. Step 614 describes the process of sending a second message from the second RAT to the first RAT where the message is encapsulated in a third message, at step 616, into a format used by the first RAT for inter-RAT handover. As described above, the format of the third message is based on the underlying technology of the RAT. At step 618, the UE receives the RRCConnectionReconfiguration message and uses the contents of the message to perform an inter-RAT handover and to configure proximity indication reporting within the UE.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any module with one or more processors, etc.). For example, a machine-accessible medium includes recordable/nonrecordable media (e.g., read-only memory (ROM); random access memory (RAM); magnetic disk storage media; optical storage media; flash memory devices; etc.).

The term "logic," as used herein, can include, for example, special-purpose hardwired circuitry, software, and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method for configuring proximity indication reporting in a wireless device as part of an inter-radio access technology (inter-RAT) handover (HO) procedure, the method comprising:
receiving a HO command containing a message generated by a first RAT system as part of an inter-RAT handover procedure to hand over the wireless device from the first RAT system to a second RAT system,
wherein the message contains a plurality of data sets, wherein a first data set of the plurality of data sets contains information to hand over the wireless device from the first RAT system to the second RAT system, and
wherein a second data set of the plurality of data sets contains proximity indication reporting information to configure proximity indication reporting in the wireless device as part of the inter-RAT handover procedure; and
as part of the Inter-RAT handover procedure, in response to receiving the message, configuring the proximity indication reporting in the wireless device; and
performing a handover of the wireless device from the first RAT to the second RAT.

2. The method of claim 1, wherein the first RAT system is a non-EUTRAN system, and wherein the second RAT system is a long term evolution (LTE) system.

3. The method of claim 1, wherein the message is an RRCConnectionReconfiguration message.

4. The method of claim 3, wherein the RRCConnectionReconfiguration message is further packaged by the first RAT system into the HO command sent to the wireless device.

5. The method of claim 4, wherein the HO command is a HANDOVER FROM UTRAN COMMAND message or a packet switched (PS) HANDOVER COMMAND message.

6. The method of claim 1, wherein the proximity indication reporting information includes a parameter to enable or disable proximity indication reporting at the wireless device, and when the information indicates enabling proximity indication reporting, the wireless device enables proximity indication reporting.

7. The method of claim 1, wherein the proximity indication reporting information includes a ReportProximityConfig message.

8. A method for configuring proximity indication reporting for a wireless device as part of an inter-radio access technology (inter-RAT) handover procedure, the method comprising:
receiving, at a second radio access technology (RAT) system, from a first RAT system a handover (HO) preparation request message;
generating, at the second RAT system, a first data set into a message, wherein the first data set contains information to handover the wireless device from the first RAT system to the second RAT system;
generating, at the second RAT system, a second data set into the message, wherein the second data set contains proximity indication reporting information, and wherein the second data set is used by a second RAT system to configure proximity indication reporting in the wireless device as part of the inter-RAT handover procedure;
transmitting, at the second RAT system, the message to the first RAT system;
encapsulating, at the first RAT system, the message into a HO command;
transmitting, at the first RAT system, the HO command to the wireless device;
configuring, at the wireless device, proximity indication reporting based on the second data set; and
performing, at the wireless device, a handover from the first RAT system to the second RAT system.

9. The method of claim 8, wherein the message is an RRCConnectionReconfiguration message.

10. The method of claim 9, wherein the proximity indication reporting information includes a parameter to enable or disable proximity indication reporting at the wireless device, and when the parameter indicates enabling proximity indication reporting, the wireless device enables proximity indication reporting.

11. The method of claim 8, wherein the proximity indication reporting information includes a ReportProximityConfig message.

12. The method of claim 11, wherein the ReportProximityConfig message reports a proximity of a closed subscriber group.

13. A system to configure proximity indication reporting in a mobile device utilizing an inter-radio access technology (inter-RAT) handover communication process, the system comprising:

a first radio access technology (RAT) system, the first RAT system further comprising:
  a processor configured to generate a first handover request,
    wherein the first handover request contains a first data set and a second data set, the first data set containing information to cause a mobile device to receive service from the first RAT system, the second data set containing information to cause the mobile device to configure proximity indication reporting in the mobile device, and
  a communication module configured to send the first handover request for delivery to the mobile device; and
a second RAT system, the second RAT system further comprising:
  a communication module configured to receive the first handover request for delivery to the mobile device and to send a second handover request to the mobile device, and
  a processor configured to create the second handover request,
wherein the second handover request includes the first handover request, and
wherein the mobile device is configured to enable the mobile device to detect a RAT object in the first RAT system and receive packet switched service from the first RAT system, based on the second data set.

14. The system of claim 13, wherein the second RAT system is a non-EUTRAN system and the first RAT system is a long term evolution (LTE) system.

15. The system of claim 13, wherein the first handover request is an RRCConnectionReconfiguration message.

16. The system of claim 13, wherein the second handover request is a packet switched (PS) HANDOVER COMMAND message or a HANDOVER FROM UTRAN COMMAND message.

17. The system of claim 13, wherein when the information of the second data set indicates enabling the proximity indication reporting, the mobile device enables proximity indication reporting.

18. The system of claim 13, wherein the proximity indication reporting information includes a reportProximityConfig message to report the proximity of a closed subscriber group.

19. The method of claim 2, wherein the non-EUTRAN system is one of a GSM, GPRS, UTRA, or CDMA2000 system.

20. The system of claim 14, wherein the non-EUTRAN system is one of a GSM, GPRS, UTRA, or CDMA2000 system.

* * * * *

UNITED STATES PATENT AND TRADEMARK OFFICE
CERTIFICATE OF CORRECTION

PATENT NO.      : 8,086,236 B2
APPLICATION NO. : 12/984597
DATED           : December 27, 2011
INVENTOR(S)     : Chih-Hsiang Wu

Page 1 of 1

It is certified that error appears in the above-identified patent and that said Letters Patent is hereby corrected as shown below:

In column 4, line 2, delete "CPRS," and insert -- GPRS, --, therefor.

In column 7, line 65, in claim 1, delete "Inter-RAT" and insert -- inter-RAT --, therefor.

Signed and Sealed this
Twentieth Day of March, 2012

David J. Kappos
*Director of the United States Patent and Trademark Office*